Figure 1:
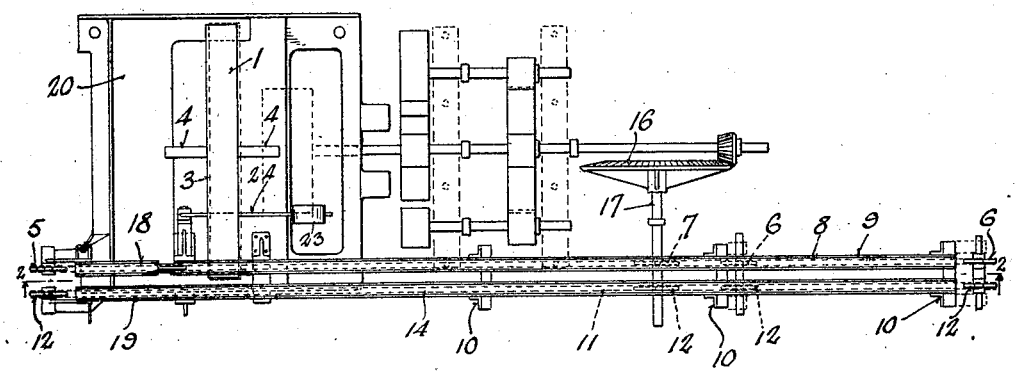

Sept. 28, 1926.

R. LANGILL

LOG SAWING MACHINE

Filed Oct. 3, 1924        3 Sheets-Sheet 1

INVENTOR.
ROSS LANGILL
BY
ATTORNEYS.

Sept. 28, 1926.  
R. LANGILL  
LOG SAWING MACHINE  
Filed Oct. 3, 1924  
1,601,219  
3 Sheets-Sheet 2

INVENTOR.  
ROSS LANGILL  
BY  
ATTORNEYS.

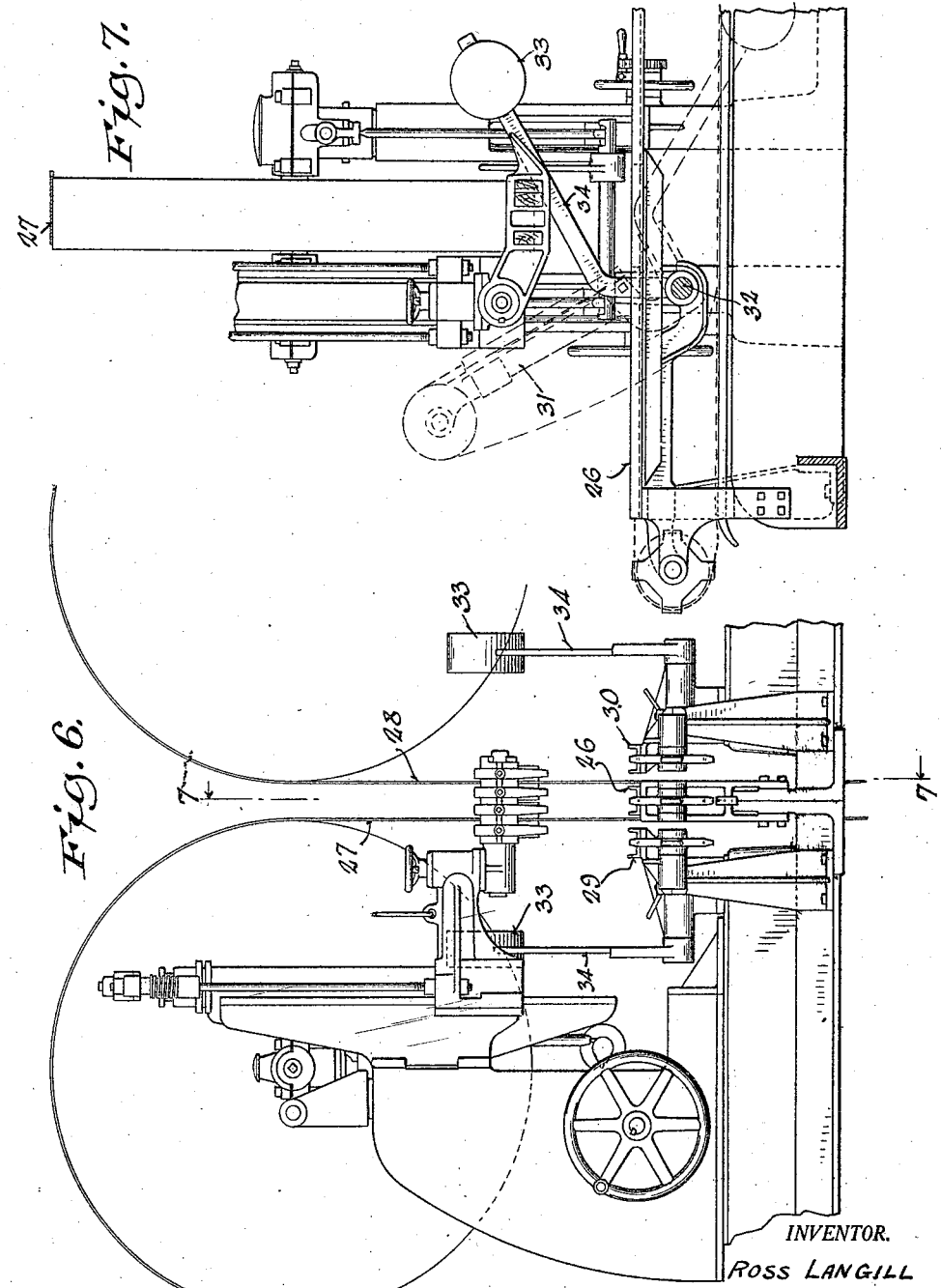

Patented Sept. 28, 1926.

1,601,219

UNITED STATES PATENT OFFICE.

ROSS LANGILL, OF MENOMINEE, MICHIGAN, ASSIGNOR TO THE PRESCOTT COMPANY, OF MENOMINEE, MICHIGAN, A CORPORATION OF MICHIGAN.

LOG-SAWING MACHINE.

Application filed October 3, 1924. Serial No. 741,303.

This invention relates to improvements in log-sawing machines.

One object of the invention is to provide means in a machine of the character described which will permit of the use of a band saw as distinguished from circular saws and the like such as now used.

Heretofore it has been necessary to use circular saws to cut or split logs of any appreciable length. The use of circular saws for this purpose rather than band saws, however, has several disadvantages. It is not practical to make circular saws large enough to cut logs over thirty inches in diameter. A band saw wastes only about forty per cent as much of the lumber, in the form of saw dust, as a circular saw, and can split logs of almost unlimited diameter. The band saw, furthermore, is safer to use than a circular saw, the teeth thereof moving directly downward through the lumber so that there is no tendency for the log to throw or jump. When a circular saw is used there is a tendency at times for the stock to throw or jump back, resulting in injury and some times death to the operators. In using a circular saw for cutting or splitting logs of any appreciable length, it is necessary to provide a support for the logs extending some distance beyond the saw so that the portion of the log which has been cut is supported thereby until the remainder has been cut. The support used for this purpose in connection with circular saws could not be satisfactorily used with a band saw for the reason that the extended portion thereof would not permit renewal of the band saw without dismantling a portion of the machine.

Another object of the invention is to provide an improved machine for cutting or splitting logs.

Another object is to provide a band saw with improved means adapted to properly support logs as they are fed through the saw and to permit ready renewal of the saw.

Another object is to provide an improved frame which can be readily applied to a band saw of the usual construction whereby the saw can be efficiently used for splitting logs.

Other objects and advantages will hereinafter appear.

For the purpose of illustrating the invention, an embodiment thereof is shown in the drawings, in which—

Figure 2:
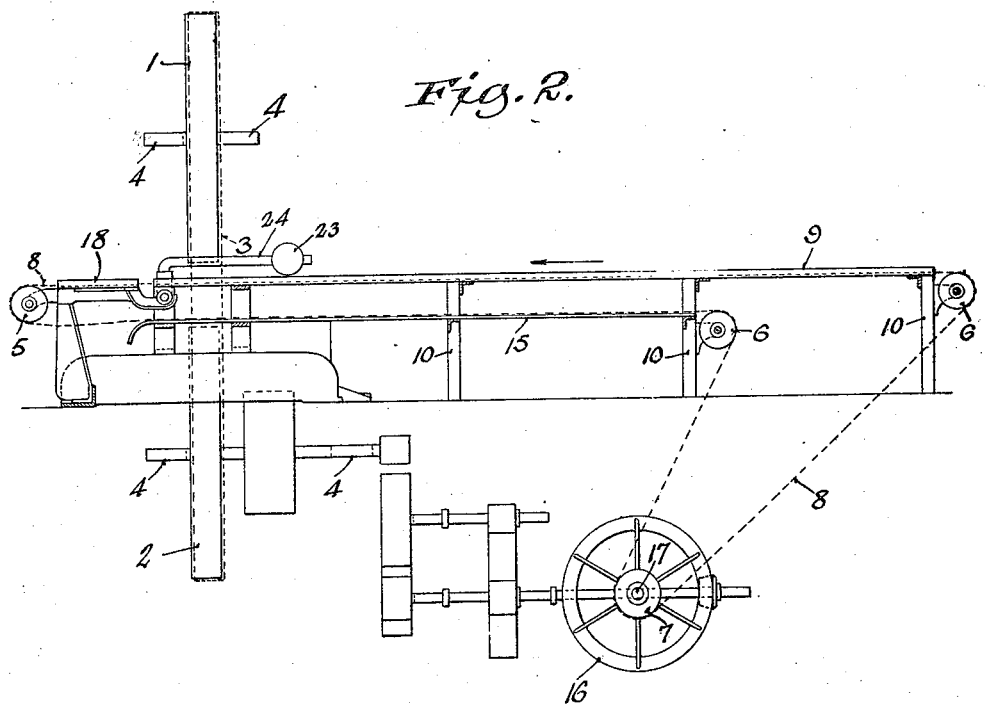
Figure 3:
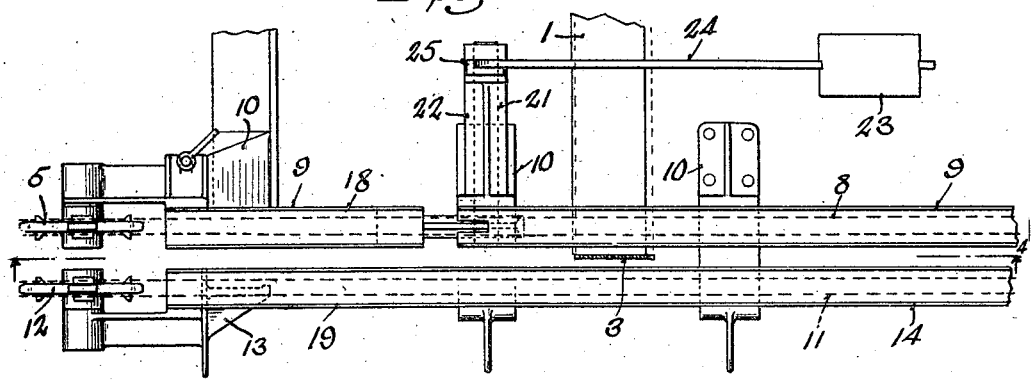
Figure 4:
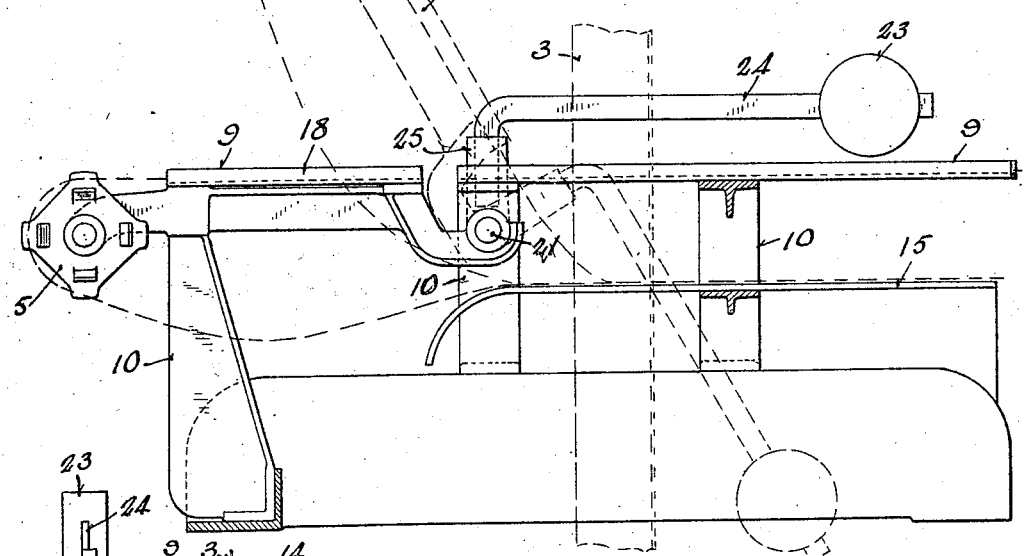
Figure 5:
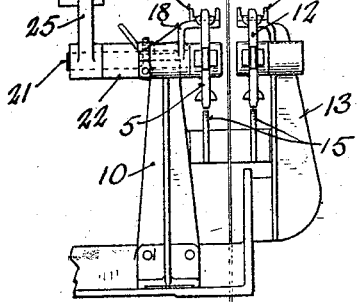

Figure 1 is a plan view of the machine;
Fig. 2 is a section on line 2—2 of Fig. 1;
Fig. 3 is a plan view;
Fig. 4 is a section on line 4—4 of Fig. 3, showing the manner in which a portion of the improved frame is movable to permit renewal of the saw;
Fig. 5 is an end elevation, looking toward the right in Fig. 3;
Fig. 6 is an end elevation, showing a pair of band saws provided with the improved frame and arranged to make two cuts in a log; and
Fig. 7 is a section on line 7—7 of Fig. 6.

In Figs. 1 and 2 the machine is shown as comprising wheels 1 and 2 over which a band saw 3 is placed, the wheels being mounted in suitable bearings 4. Sprocket wheels 5, 6 and 7 may be arranged as shown in Figs. 1 and 2 to move chain 8 along an inner chain-way or channel member 9 in the direction of the arrow, the chain extending slightly above the flanges of the channel member so that a log can be placed thereon and carried forward thereby through saw 3. The chain-way 9 may be supported in any suitable way, such as by posts 10. A second chain 11 is driven by sprocket wheels 12 arranged in the same manner and adjacent to sprocket wheels 5, 6 and 7, wheels 12 being supported in any suitable manner such as by posts 13. The upper portion of chain 11 moves along an outside chain-way or channel member 14 similar to chain-way 9. The lower portions of the chains ride over a support or guide 15 arranged between posts 10 and 13 and supported thereby. The chains may be driven by a gear 16 fixed to shaft 17. As indicated in Figs. 1 and 2, suitable gearing may be arranged to drive wheels 1 and 2 from gear 16.

The outer ends 18 and 19 of chain-ways 9 and 14 are extended beyond the saw 3 to support the portion of the log which has been cut until the remainder thereof has also been cut. These extended portions of the chain-ways would not permit removal of saw 3 through the saw pit 20 without dismantling a portion of the machine, if no provision were made therefor. For this purpose, the outer end portion 18 of inner chain-way 9 is fixed to a shaft 21 journaled in a bearing 22 with which one of posts 10 is provided, as shown in Figs. 3 to 5. A counterweight 23 is fixed to one end of an arm 24, the other end of the arm being bent at right angles thereto and secured to a member 25 fixed to shaft 21. Weight 23 is positioned on arm 24 so that it tends to rotate shaft 21. It therefore requires little effort to swing the outer end 18 of chain-way 9 upwardly to the position shown in dotted lines in Fig. 4.

A log is placed upon chains 8 and 11 and carried forward thereby through saw 3, the extended ends 18 and 19 of chain-ways 9 and 14 properly supporting the log until it is split or cut. When it is necessary to renew saw 3 for sharpening or for any other reason, the extended portion 18 of chain-way 9 is swung upwardly to the position shown in dotted lines in Fig. 4 so that it does not extend beyond saw pit 20. Saw 3 may then be slipped laterally from wheels 1 and 2 and lifted from the pit.

In the embodiment shown in Figs. 6 and 7, two band saws are provided with the improved frame and mechanism for supporting and feeding the logs through the saws, the saws being arranged to make two cuts in the log. A chain-way 26, similar to chain-way 14, is arranged between the saws 27 and 28. Chain-ways 29 and 30 are similar to chain-way 9 and supported in a like manner each side of chain-way 26. The log in passing through the saws rests upon and is moved forwardly by three chains. The outer extended portion 31 of chain-way 29 is fixed to shaft 32 for upward movement in the same manner and for the same purpose as extended portion 18 of chain-way 9. The extended portion of chain-way 30 is constructed in the same manner. Weights 33 are fixed to arms 34 which are connected to the extended portions of chain-ways 29 and 30 to urge the same upwardly in the same manner and for the same purpose as explained above in connection with weight 23.

The other portions of the machine may be of any suitable construction and the details thereof are only shown and described with sufficient clearness to enable those skilled in the art to understand the manner in which a band saw can be used efficiently for cutting and splitting logs, as explained above.

Various changes of structure and arrangement of the parts may be adopted without departing from the spirit of the invention or the scope of the claims.

The invention claimed is:

1. The combination with a pit, a wheel arranged in said pit, a second wheel arranged above said first wheel and in the plane thereof, bearings for supporting said wheels for rotation about relatively fixed parallel axes, a band saw arranged upon said wheels, and means arranged transversely of said plane for supporting and conveying lumber to and through said saw, the end of said conveying means adjacent said saw being arranged between the cutting side of the latter and said bearings and terminating short of the outer edge of said pit, of means associated with said conveying means and providing an extension thereof extending beyond said edge of said pit, said last-named means being supported for movement with respect to said conveying means in a direction away from said edge of said pit whereby the portion of said saw in said pit may pass between said edge and said last-named means upon lateral movement of said saw toward the outer edge of said pit from operative relation with respect to said wheels and subsequent upward movement of said saw.

2. The combination with a pit, a pair of superimposed wheels, one of said wheels being arranged in said pit, means supporting said wheels for rotation in the same plane and about relatively fixed parallel axes, and a band saw arranged upon said wheels, of an endless chain arranged transversely of said plane and extending between said means and said saw and beyond the outer edge of said pit, means for supporting said chain to permit the latter to support and convey lumber to and through said saw and terminating short of the outer edge of said pit, means extending over said pit and beyond said edge thereof and providing an extension of said chain-supporting means, said extension being movable to inoperative position to effect movement of the chain overlying said pit away from the outer edge thereof whereby said saw may be passed between said overlying chain portion and the outer edge of said pit upon outward lateral movement of the saw from operative relation with respect to said wheels and subsequent upward movement of said saw.

3. The combination with a pit, a pair of superimposed wheels, one of said wheels being arranged in said pit, means supporting said wheels for rotation in the same plane and about relatively fixed parallel axes, and a band saw arranged upon said wheels, of an endless chain arranged transversely of said plane and extending between said means and said saw and beyond the outer edge of said pit, means for supporting said chain to permit the latter to support and convey lumber to and through said saw and terminating short of the outer edge of said pit, means extending over said pit and beyond said edge thereof and providing an extension of said chain-supporting means and being pivotally connected to the latter for movement with respect thereto in a vertical plane to inoperative position to effect movement of the chain overlying said pit away from the outer edge thereof whereby said saw may be passed between said overlying chain portion and the outer edge of said pit upon outward lateral movement of the saw from operative relation with respect to said wheels and subsequent upward movement of said saw.

4. In a log-sawing machine having a pit, a pair of wheels mounted one above the other, bearings for said wheels, one of said wheels being positioned in said pit, a band saw extending around said wheels for movement thereby, and means arranged to support a log for cutting by said saw, a portion of said means being arranged between the cutting portion of said saw and said bearings and extending beyond said saw and over said pit, said portion being movable to permit the lower portion of said saw to pass between said portion and the outer edge of said pit upon outward lateral movement of said saw from operative relation with respect to said wheels and subsequent upward movement of said saw.

5. In a log-sawing machine having a pit, a pair of wheels mounted one above the other, one of said wheels being positioned in said pit, a band saw extending around said wheels for movement thereby, members associated with said saw and arranged adjacent each side thereof to support a log for cutting thereby, chains guided by said members and adapted to feed the log to said saw, and means for moving said chains, said members being extended beyond said saw and over said pit, the extended portion of one of said members being mounted for pivotal movement with respect thereto to permit removal of said saw through said pit.

In witness whereof I hereto affix my signature.

ROSS LANGILL.